United States Patent [19]
Derbyshire

[11] Patent Number: 5,025,128
[45] Date of Patent: Jun. 18, 1991

[54] RIVET WITH INTEGRAL HEATER
[75] Inventor: Rodney L. Derbyshire, Menlo Park, Calif.
[73] Assignee: Metcal, Inc., Menlo Park, Calif.
[21] Appl. No.: 278,774
[22] Filed: Dec. 2, 1988
[51] Int. Cl.$^5$ .............................................. H05B 6/00
[52] U.S. Cl. ................... 219/200; 156/272.4
[58] Field of Search ............. 156/91, 92, 272.2, 272.4; 219/200, 201, 229

[56] References Cited
U.S. PATENT DOCUMENTS

| | | | |
|---|---|---|---|
| 3,253,495 | 5/1966 | Orloff | 85/70 |
| 3,277,771 | 10/1966 | Reynolds | 85/72 |
| 3,288,016 | 11/1966 | Reynolds | 85/70 |
| 3,425,259 | 2/1969 | Baugh | 72/391 |
| 3,446,509 | 5/1969 | Colosimo | 279/7 |
| 3,464,472 | 9/1969 | Reynolds | 151/2 |
| 3,693,399 | 9/1972 | Chirco | 72/391 |
| 3,726,553 | 4/1973 | Reynolds et al. | |
| 3,792,545 | 2/1974 | Chirco et al. | 91/412 |
| 3,820,297 | 6/1974 | Hurd | |
| 3,915,052 | 10/1975 | Ruhl | 85/7 |
| 4,093,491 | 6/1978 | Whelpton et al. | 219/229 |
| 4,163,311 | 8/1979 | Sigmund | 29/407 |
| 4,223,632 | 9/1980 | Cadwallader | 118/58 |
| 4,230,017 | 10/1980 | Angelosanto | 85/70 |
| 4,256,945 | 3/1981 | Carter et al. | 219/229 |
| 4,347,728 | 9/1982 | Smith | 72/391 |
| 4,405,273 | 9/1983 | Ruhl et al. | 411/43 |
| 4,432,679 | 2/1984 | Angelosanto et al. | 411/34 |
| 4,473,914 | 10/1984 | Haft | 10/11 R |
| 4,580,435 | 4/1986 | Port et al. | 72/391 |
| 4,587,829 | 5/1986 | Sukharevsky | 72/391 |
| 4,598,572 | 7/1986 | Mondello et al. | 72/391 |
| 4,615,206 | 10/1986 | Rosier | 72/391 |
| 4,627,775 | 12/1986 | Dixon | 411/34 |
| 4,702,655 | 10/1987 | Kendall | 411/43 |
| 4,752,673 | 6/1988 | Krumme | 219/229 |
| 4,836,691 | 6/1989 | Suzuki et al. | 156/272.4 |

FOREIGN PATENT DOCUMENTS 3210310 9/1983 Fed. Rep. of Germany ........ 156/92
190473 7/1937 Switzerland ......................... 219/200

OTHER PUBLICATIONS
Materials in Design Engineering, "Mechanical Joints", pp. 143, 144, Jan. 1958.

Primary Examiner—A. D. Pellinen
Assistant Examiner—Geoffrey S. Evans
Attorney, Agent, or Firm—Howard L. Rose

[57] ABSTRACT

A blind rivet or bolt is rendered fluid tight by applying heat activated sealant to some or all of the surfaces of the rivet that contact surfaces of the structure into which the rivet is inserted. The sealant is activated by a temperature self regulating heater formed by applying ferromagnetic material to appropriate locations on the rivet and heating the ferromagnetic material by an energizing structure associated with the rivet actuation tool, the structure depending upon whether the heater is activated by flux coupling from a coil or by ohmic heating.

17 Claims, 3 Drawing Sheets

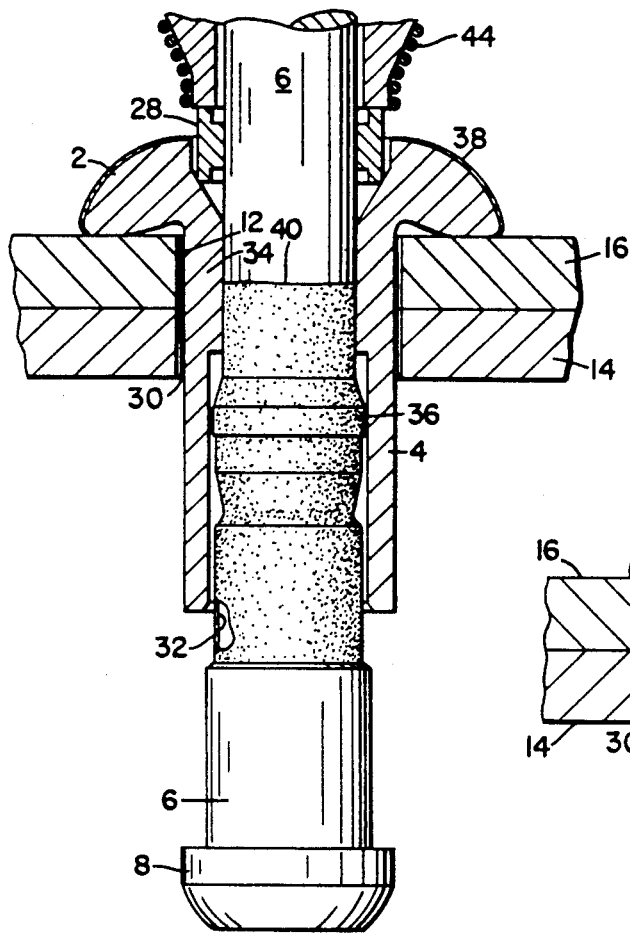
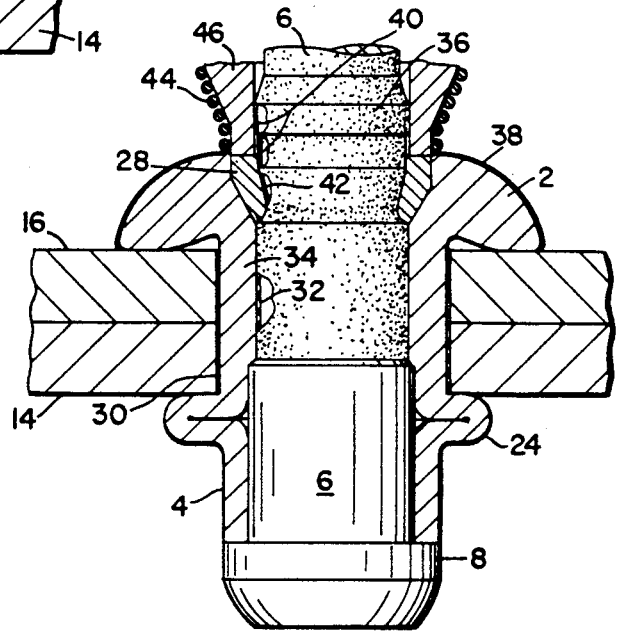
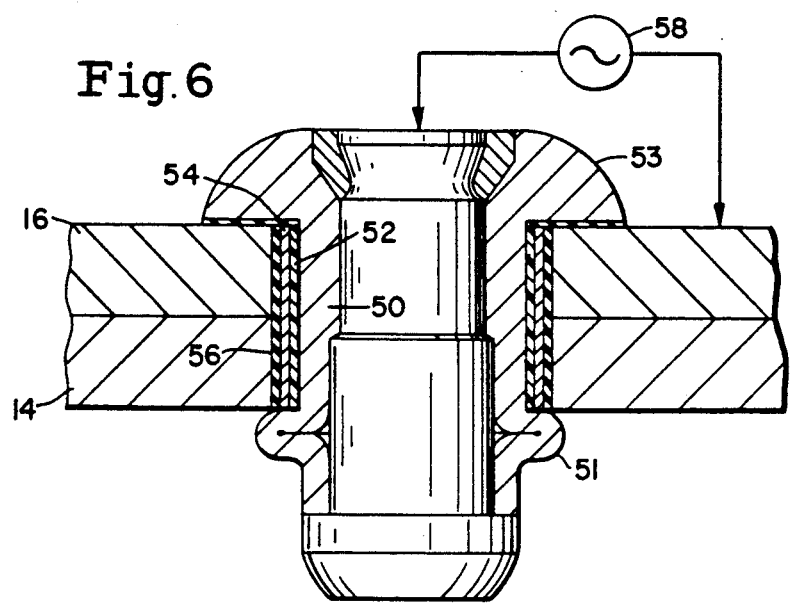

RIVET WITH INTEGRAL HEATER

The present invention relates to blind riveting systems and more particularly to blind rivets and associated equipment and method for heating the rivets at the time of installation or subsequent thereto in order to heat a sealant to achieve fluid tight joining of materials.

BACKGROUND OF THE INVENTION

Blind rivets are widely used in industry, commerce and by homeowners. The present invention is particularly applicable to industrial usage although it may be employed in the other areas mentioned above.

In the modern aerospace industry, as an example, blind rivets or bolts as they are sometimes called, are used extensively in assembling airframes and particularly hollow wing sections employed as fuel storage tanks. A problem often develops due to leakage around the rivets. As in other blind rivet installations for fastening together two pieces of metal or other materials such as composites, the rivet which may be of metal or a composite, is inserted in aligned holes of the plates or members to be joined, a center shaft of the rivet which is attached to the head of the rivet on the blind side, is clamped in jaws and pulled until the head is upset and then the region of the rivet at the access side is upset with the plates clamped between the two upset regions.

In the above example, the rivet-hole combination, although closely toleranced, often leaves small spaces around the rivets causing drippage of fuel usually at a very slow but still undesirable rate.

The above example is just one use for blind rivets where liquid or even fluid tight performance is desired if not required. Assembly of any structure requiring fluid tight construction with blind rivets is a ready candidate for the improvements provided by the present invention.

BRIEF DESCRIPTION OF THE INVENTION

In accordance with the present invention, a blind rivet has a region coated with a heat activated sealant and incorporates a temperature self regulating heater which may be activated by the rivet insertion tool. Specifically, the rivet has a region adjacent to where the insertion tool is clamped to the rivet during insertion and/or activation, that is coated with a ferromagnetic material, such as Alloy 42. The insertion tool may heat the ferromagnetic material by resistive or inductive heating of the ferromagnetic material; the heat thus generated being transported through the rivet to the region coated with the heat activated sealant. The sealant is thus heated and melted and/or cured to provide a fluid tight bond between the rivet and the adjacent surfaces of the member or members through which the rivet extends.

The temperature self regulating aspect of the present invention is based on the fact that all ferromagnetic materials have a Curie temperature that as it is approached the material loses its ferromagnetic properties. If resistive heating is employed then the principles of operation are as set forth in U.S. Pat. No. 4,256,945 with or without the copper layer. If inductive heating is employed then as the ferromagnetic material becomes substantially non-magnetic, the induction coupling to the material is reduced and the rivet cools, see U.S. Pat. No. 4,745,264. Thus the temperature of such a system cycles in a narrow range about the effective Curie temperature of the ferromagnetic material. The effective Curie temperature refers to the temperature at which the material becomes substantially paramagnetic as opposed to totally non-magnetic. The difference between absolute Curie temperature and effective Curie temperature is a function of the material and may be a few degrees and as much as 100° C. By choosing a ferromagnetic material having a Curie temperature safely above the curing or activation temperature of the sealant, the seal is affected and just as important the sealant is not subject to excessive and very likely destructive heating. The subject matters of the aforesaid patents, to the extent necessary to understand the operation of the heaters employed in the present invention, are incorporated herein by reference.

The term "sealant" as used herein refers to any material that upon heating can form a fluid tight bond by simple melting or by curing or both; and includes glues, mastics, resins, epoxies and the like. Materials that may be employed are Dynamold, Inc.'s moldable shim material MS-26 or DMS-4-828.

In a specific embodiment of the present invention, the blind rivet comprises a tubular sleeve integral with a shaped head that remains on the accessible side of the structure with the sleeve extending through aligned holes of members to be joined. The tubular sleeve has a sealant on its outer surface and if necessary, on its inner hollow surface. The shaped head of the device has a ferromagnetic coating over at least that region that is either in contact with or closely adjacent the jaws or anvil of the insertion tool. If magnetic coupling is employed, a coil is wound about a region of the anvil or jaws close to the ferromagnetic material. Thus upon energization of the coil with preferably high frequency current, typically radio frequencies and preferably frequencies of 8 MHz to 20 MHz, eddy currents and hysteresis heating of the ferromagnetic material results in heating the head and by conduction the sleeve. It should be noted that a ferromagnetic coating may also be applied to the pin which carries the head end employed to seal the blind side of the opening.

In operation the blind rivet modified in accordance with the present invention is inserted into a hole and the riveting or application tool actuated to complete the riveting effect. Thereafter either immediately or at a subsequent time a coil associated with the application tool or a separate tool is energized and the heater is heated to activate the sealant and produce a fluid tight coupling.

As indicated above, the blind rivets of the present invention may be employed preferably with modification, with structures fabricated from advanced composite materials, for instance, KEVLAR and carbon fiber reinforced epoxy resin systems. See also *Advanced Composite Materials*, Edited by D. J. DeRenzo, Noyes Data Corporation, pp 573-577. Since such materials are not necessarily good heat conductors, the head of such a blind rivet is preferably quite large so as to soak the materials in heat, that is, develop large areas of heated composite material whereby the heat necessary to activate the sealant not only can be developed, but can be conveyed to the sealant in a reasonable length of time.

BRIEF DESCRIPTION OF THE DRAWINGS

FIG. 4 illustrates the rivet before activation that has been modified in accordance with the present invention;

FIG. 5 illustrates the rivet of FIG. 4 after activation;

FIG. 6 illustrates an embodiment employing resistive heating, and

DETAILED DESCRIPTION OF THE INVENTION

Figure 1:
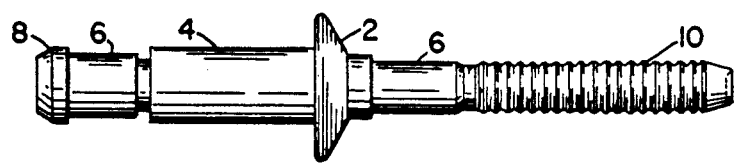
FIGS. 1-3 illustrate a prior art rivet in various stages of use, that is to be modified in accordance with the present invention.

Referring now specifically to FIG. 1 of the accompanying drawings, there is illustrated one of several types of standard prior art blind rivets. The rivet has a head 2 and an integral deformable cylindrical sleeve 4 in axial alignment with the head. A pin 6 extends through the sleeve to a head member 8 at the end of the pin 6 remote from the head 2. The pin 6 terminates remote from head 8 in a series of threads or circumferential groove 10 adapted to be engaged by a set of jaws on the activation tool as is illustrated subsequently.

Figure 2:
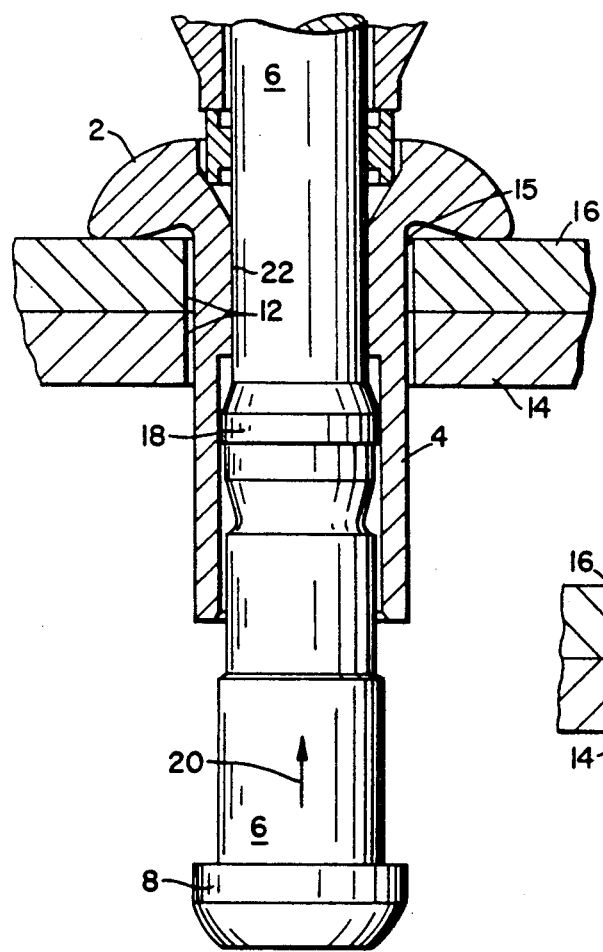

FIG. 2 of the accompanying drawings illustrates the prior art rivet located in aligned holes through two members to be joined. It is noted that the sleeve 4 of the rivet is spaced, space 15, from walls 12 of aligned holes through plates 14 and 16 to be joined. The pin 6 has an enlarged region or band 18 which when the pin 6 is pulled in the direction of arrow 20, enters a region 22 of sleeve 4 of reduced internal diameter so as to expand the sleeve 4 to fill the spaces 15 between the sleeve 4 and walls of plates 14 and 16 and any space that may exist between pin 6 and the sleeve 4, see FIG. 3. The head 8 engages the blind end of sleeve 4 and buckles it, as at 24. An anvil or chuck 26, a part of the activation tool, presses a retaining sleeve or ring 28 into a generally conical space along the axis of head 2 to secure the position of the head 2 along the pin 6.

Referring to the expansion of the sleeve 6 to seal the space 15, quite often a fluid tight seal is not obtained or if initially obtained, not maintained. In order to overcome this problem the present invention converts the blind rivet into a temperature self regulating heater to actuate a temperature activatable sealant also included in or on the modified rivet.

Figure 3:
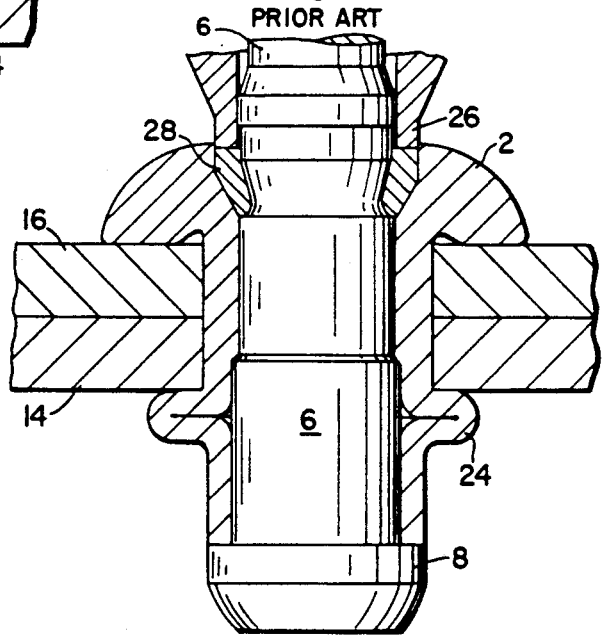

Referring now specifically to FIGS. 4 and 5 of the accompanying drawings there is illustrated the blind rivet of FIGS. 2 and 3 modified in accordance with the present invention. The sleeve 4 in the region disposed within the aligned holes through plates 14 and 16 has a layer 30 of sealant on its external surface located so that upon the sleeve being expanded upon completion of the insertion procedure, see FIG. 5 specifically, the sealant is in contact with the sides 12 of the aligned holes and the sleeve 4. A layer 32 of sealant covers the region of the pin 6 that upon completion of insertion of the blind rivet is disposed in a region 34 of reduced internal diameter of pin 6, such region being radially aligned with the region of the sealant 30.

The head 2 of the pin 6 has a coating 38 of ferromagnetic material. Breakneck 36 and the region of the pin above and below the breakneck as viewed in the figures, regions 40 and 42, may also be so coated. To complete the heater structure, a coil 44 is wound around nose piece 46 of a conventional application tool.

Little, if any, modification of the rivet is required. The coating thicknesses are measured in mils or tenths of mils and thus do not interfere with normal operation of the rivet. Selection of rivet materials may be changed to increase, if desired, the conductivity of the metals of the rivets to increase the autoregulating ratios as explained in U.S. Pat. No. 4,256,945. Alternatively, the heater may operate as one without the conductive layer.

In practice, the blind rivet of FIG. 4 is inserted in the aligned holes of the members to be joined and by means of an application tool is caused to assume the configuration of FIG. 5. When it is desired to activate the sealant 30 and sealant 32, if provided, the coil 44 is connected across a high frequency constant current source to heat the ferromagnetic layers 38, 40 and 42 to induce sufficient heat in the pin 6 and sleeve 4 to cure the sealant layer or layers. If a lock collar of a material having appropriate Curie temperature and strength is available, the lock collar 28 may be of a ferromagnetic material. As to the high frequency current, at present a frequency of 13.56 MHz is preferred.

The particular blind rivet illustrated in FIGS. 2 and 3 is that illustrated in FIGS. 8 and 10 of U.S. Pat. No. 4,432,679 and those illustrated in FIGS. 4 and 5 are modifications thereof. It should be noted that the present invention may be applied to many other configurations of blind rivets and bolts. An example of another such rivet is found in FIG. 1 of U.S. Pat. No. 4,432,679. Note U.S. Pat. Nos. 4,473,914, 4,163,311 and 3,726,553 as examples of other configurations to which the present invention is applicable. The important consideration is that conventional blind rivets and bolts can readily be adapted to provide heaters in accordance with the present invention as can be the actuating tool. Further the invention is not applicable to blind rivets only, since the same problems arise with rivets disclosed in U.S. Pat. Nos. 3,425,259 and 3,726,553. Thus, although the uses to which blind rivets are usually applied are more susceptible to the problems discussed herein, the invention is of broader utility.

Referring now specifically to FIG. 6 of the accompanying drawings there is illustrated in partial section a region of a rivet to be heated by resistive heating rather than inductive heating.

A conductive sleeve 50 of the rivet has three coatings, an innermost coating 52 of a thermally and electrically conductive sealant, an intermediate coating 54 of ferromagnetic material and an outer coating 56 of nonconductive sealant.

High frequency current is applied to the two ends of the sleeve from a constant current high frequency source 58; the remote end via the plates 14 and 16 to the upset 51 and the other end directly to the pin. In this case accessible head 53 is insulated from the plates. The ferromagnetic layer provides a pronounced skin effect at the frequency of operation confining the majority of current to the layer 54. Upon approach to Curie temperature of layer 54, heating decreases but only at a temperature above the activation temperature of the sealant. It is to be noted that the thermally and electrically conductive sealant is a part of the heater since upon approach to Curie temperature of layer 54, the current spreads into the layer 52 as well as the sleeve 50. It is realized that the layers 52 and 54 may be replaced with a sealant exhibiting ferromagnetic properties, if one is available at a proper temperature.

Figure 7:
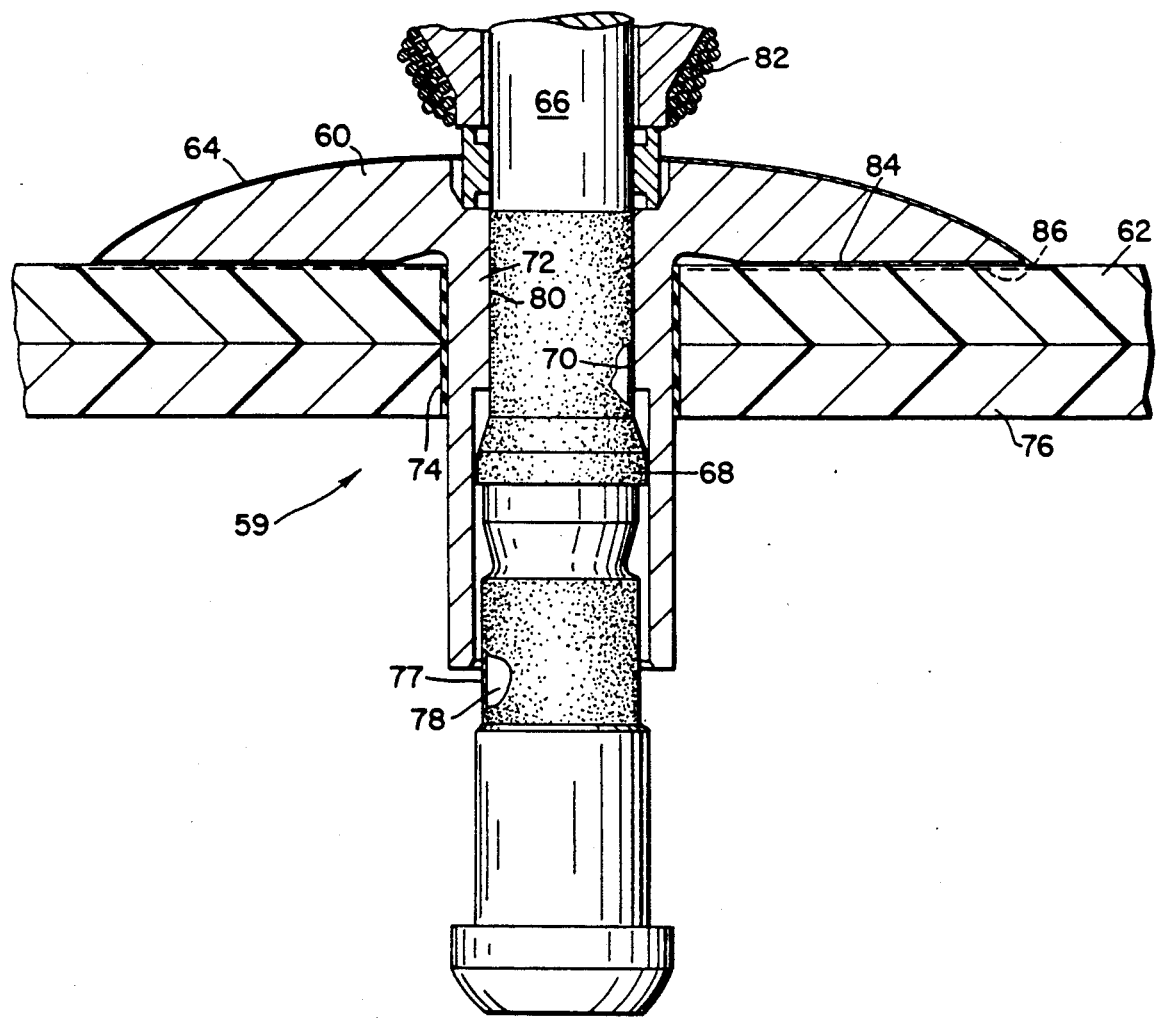
FIG. 7 illustrates a rivet modified specifically for use with structures made with composites.

Referring now specifically to FIG. 7 of the accompanying drawings, there is illustrated a blind rivet 59 with a large head 60 on the accessible side of the structure in contact with upper composite layer 62. The head 60 has a coating 64 of ferromagnetic material as does pin 66 at and above break 68, reference numeral 70. Sleeve 72 depending downwardly from head 60 has a coating of sealant 74 in the region of the holes through composite plates 62 and 76. Sealant 77 is also applied over region 78 of the pin 66 which is seated, as seen in FIG. 5, in region 80 of sleeve 72 upon completion of the riveting function.

The main difference between the rivet of FIGS. 4 and 5 and the rivet of FIG. 7 is the size of the head of the rivet and, in some instances, the sealant used. Composites such as KEVLAR and the aforesaid epoxy resins are poor heat conductors compared with metals and in order to activate the sealant, the composite layers are saturated with heat. It should also be noted that the coil, coil 82, is made larger so that the flux coupling the ferromagnetic materials is greatly increased thus increasing the Joule heating of the head 60.

Two further coatings should be observed. Coating 84 of ferromagnetic material is applied to the underside of the head 60 and coating 86, designated by a dashed line is a coating on the upper surface, as viewed in FIG. 7., of layer 62, of sealant to bond the head 60 to the layer 62.

It should be noted that some or all of the rivet 59 may be fabricated from a composite material as desired.

The term "constant current" as used herein is defined in col. 11 line 31, Equation 2 of U.S. Pat. No. 4,752,673 and is incorporated herein by reference.

Many variations and modifications of the above-described embodiments are within the ordinary skill of the skilled artisan in this art, without departing from the scope of the invention. Accordingly, those modifications and embodiments are intended to fall within the scope of the invention as defined by the following claims:

What is claimed is:

1. A heater system incorporated in a rivet and application tool comprising,
 a rivet having a pin and a sleeve that are to extend through a hole to be sealed,
 a rivet application tool having a member for gripping said pin,
 a ferromagnetic material applied to said rivet adjacent said sleeve,
 means associated with said tool to heat said ferromagnetic material to a temperature approaching its Curie temperature, and
 a heat activated sealant disposed on said sleeve in a region of the hole in which the pin is to be seated, said sealant being activated below said Curie temperature.

2. A heater system incorporated in a rivet according to claim 1 further comprising a heat activated sealant disposed in said pin adjacent to a region of the hole in which the pin is to be seated.

3. A heater system incorporated in a rivet according to claim 1 wherein said heater is an inductive heater.

4. A heater system incorporated in a rivet according to claim 1 wherein said heater is a resistive heater.

5. A heater system incorporated in a rivet according to claim 1, said application tool comprised of a lock collar constructed substantially of ferromagnetic material.

6. A heater system incorporated in a rivet according to claim 1, further comprising a ferromagnetic material applied to said pin adjacent a region of said rivet to be contacted by said tool.

7. A heater system incorporated in a rivet according to claim 1 further comprising a heat activated sealant disposed on said pin in said region.

8. A heater system incorporated in a rivet according to claim 1, further comprising successive layers of a thermally and electrically conductive, heat activated sealant; a ferromagnetic material and a non-conductive heat activated sealant disposed on said sleeve.

9. A heater system incorporated in a rivet according to claim 1, further comprising, a heat activated sealant disposed on a plate that is to be joined.

10. A blind rivet having a pin and a hollow sleeve incorporating a heater comprising:
 a pin of said rivet that is to extend through a hole in which the rivet is to be seated,
 ferromagnetic material,
 a hollow sleeve disposed about a region of said pin,
 said ferromagnetic material applied to said pin and adjacent an end of the sleeve opposite the end sleeve that extends through the hole in which the pin is to seated,
 said sleeve having a sealant disposed on that region of its external surface located within the hole,
 said sealant having an activation temperature below the Curie temperature of said ferromagnetic material.

11. A blind rivet incorporated in a heater according to claim 10, wherein said heater is an inductive heater.

12. A blind rivet incorporating a heater according to claim 10, wherein said heater is a resistive heater.

13. A blind rivet incorporating a heater according to claim 10, further comprising ferromagnetic material applied to said pin adjacent a region of said rivet to be contacted by a rivet application tool.

14. A blind rivet incorporating a heater according to claim 13, further comprising a heat activated sealant disposed on said pin in said region.

15. A blind rivet incorporating a heater according to claim 10, further comprising, successive layers of a thermally and electrically conductive, heat activated sealant; a ferromagnetic material and a non-conductive heat activated sealant disposed on said sleeve.

16. A blind rivet incorporating a heater according to claim 10, further comprising, a heat activated sealant disposed on a plate that is to be joined.

17. The method of sealing a hole with a blind rivet having a central pin and a sleeve disposed about a length of said pin said method comprising the steps of
 applying a coating of a heat activated sealant to a circumferential region of the sleeve to be located in the hole,
 applying a coating of ferromagnetic material to a region of the rivet adjacent said sleeve which when subjected to a high frequency constant current will heat the sleeve of the rivet, the ferromagnetic material having a Curie temperature above the activation temperature of the sealant,
 inserting the rivet in a hole with the sleeve located adjacent to walls of the hole,
 expanding the sleeve to fill substantially the hole, and
 subjecting the ferromagnetic material to a constant current to cause the ferromagnetic material to approach its Curie temperature and suffer a decrease in permeability such that its temperature falls.

* * * * *